(12) United States Patent
Verdoes et al.

(10) Patent No.: US 10,406,452 B2
(45) Date of Patent: Sep. 10, 2019

(54) APPARATUS AND METHOD FOR SEPARATING SOLID PARTICLES FROM A SLURRY

(75) Inventors: Dirk Verdoes, Delft (NL); Johannes van der Meer, Delft (NL); Michiel Nienoord, Delft (NL); Michael Sell, Delft (NL); Jean-Marie Collard, Delft (NL)

(73) Assignee: NEDERLANDSE ORGANISATIE VOOR TOEGEPAST-NATUURWETEN SCHAPPELIJK ONDERZOEK TNO, Delft (NL)

( * ) Notice: Subject to any disclaimer, the term of this patent is extended or adjusted under 35 U.S.C. 154(b) by 0 days.

(21) Appl. No.: 13/978,320

(22) PCT Filed: Jan. 3, 2012

(86) PCT No.: PCT/NL2012/050002
§ 371 (c)(1),
(2), (4) Date: Oct. 17, 2013

(87) PCT Pub. No.: WO2012/093937
PCT Pub. Date: Jul. 12, 2012

(65) Prior Publication Data
US 2014/0042108 A1    Feb. 13, 2014

(30) Foreign Application Priority Data

Jan. 4, 2011    (EP) ..................................... 11150115

(51) Int. Cl.
*B01D 9/00*        (2006.01)
(52) U.S. Cl.
CPC ............... *B01D 9/00* (2013.01); *B01D 9/005* (2013.01); *B01D 9/0045* (2013.01)

(58) Field of Classification Search
None
See application file for complete search history.

(56) References Cited

U.S. PATENT DOCUMENTS

2003/0060661 A1* 3/2003 Eck et al. ..................... 562/600
2004/0256319 A1 12/2004 Hammon et al.
(Continued)

FOREIGN PATENT DOCUMENTS

DE    10223058    12/2003
EP    0776875    6/1997

OTHER PUBLICATIONS

International Search Report for PCT/NL2012/050002 dated Mar. 20, 2012 (2 pages).

*Primary Examiner* — Mikhail Kornakov
*Assistant Examiner* — Pradhuman Parihar
(74) *Attorney, Agent, or Firm* — OspreyIP, pllc; James R. Cartiglia

(57) ABSTRACT

The invention is directed to an improvement in operation of wash columns, and more in particular to an apparatus for separating solid particles from a slurry and to a process for separating solid particles from a mother liquor slurry. The apparatus of the invention comprises a wash column (1), which comprises a melting circuit (8,10,11,21), wherein means (22,23) are present to introduce a compound or composition to said wash column between a wash front (6*b*) formed in said wash column in operation and a product outlet and/or in the melting circuit. The process of the invention comprises separating the liquid from the solid particles by filtration with the aid of at least one filtering element (4), while a packed bed of solid particles coming from the mother liquid slurry forms near said filtering element (4), and wherein a wash front (6*b*) forms which is obtained by bringing a washing liquid in counter current to the solid particles in the bed, the bed being subjected to a (Continued)

movement in the direction of said wash front (6b), while a product stream comprising the material of said solid particles is obtained by continuously discharging a portion of said washing liquid, wherein a portion of said bed is continuously disintegrated, characterized in that a compound or composition is introduced into said wash column (1) between the wash front (6b) and a product outlet and/or in a melting circuit (8,10,11,21), and wherein the introduction of the said compound or composition decreases the equilibrium temperature of the contents of the melting circuit (8,10,11,21), further characterized by the feature that the introduced compound or composition is completely miscible with the product suspension and/or molten product being present in the said melting circuit (8,10,11,21).

12 Claims, 6 Drawing Sheets

(56) References Cited

U.S. PATENT DOCUMENTS

| | | | |
|---|---|---|---|
| 2008/0226529 A1* | 9/2008 | Scholz | C01B 25/238 |
| | | | 423/317 |
| 2009/0018347 A1* | 1/2009 | Heilek et al. | 548/555 |

* cited by examiner

APPARATUS AND METHOD FOR SEPARATING SOLID PARTICLES FROM A SLURRY

The invention is directed to an improvement in operation of wash columns, and more in particular to an apparatus for separating solid particles from a slurry and to a process for separating solid particles from a mother liquor slurry.

Wash columns are efficient solid/liquid separators, which are in particular suitable for use in separating the product stream of suspension crystallization from the melt to obtain products with a high purity against relatively low costs and low energy consumption. Several types of forced transport wash columns are known. The most important use of forced transport wash columns is as advanced solid-liquid separator in suspension based melt crystallization processes. In such a suspension-based melt crystallization processes an upstream crystallizer is responsible for producing a suspension. A wash column is then used for separating the formed crystals from the remaining mother liquor. Typically, the suspension is generated by cooling an impure feed below its equilibrium crystallization temperature. The freezing point depression of the mixture to be crystallized increases with increasing impurity concentration. For any impure feed, the operating temperature of the crystallizer will thus be below the melting temperature of the pure, crystallized compound.

The term "forced transport" refers to the fact that the transport of the porous bed that contains the crystals is forced, which means that it is not caused, or at least not only caused, by gravity. Known forces to enhance bed transport are: mechanical devices like pistons or screw conveyors or hydraulic forces. Gravity wash columns, in which the crystal bed is only transported by means of gravity, form another well-known class of wash columns. This type of wash columns has distinct disadvantages compared to the forced transport wash columns, like the relatively low specific production capacity and the need for relatively large crystals. For this reason, in the framework of the present invention forced transport wash columns are preferred over gravity wash columns. The operating principles of forced transport wash columns are described in the next paragraph.

The task of the wash column is to separate the pure crystals as good as possible from the impure mother liquor in order to maximize the purification efficiency for the process. In a forced transport wash column the purification is based on a combination of two separation principles, solid-liquid separation by means of filtration and countercurrent washing. At the feed side of the wash column the suspension generated in the crystallizer enters the wash column. This feed can be located at the top or the bottom of the wash column, as the operating principle is independent on the vertical arrangement of the column. This also illustrates that gravity is of no or limited importance for the operation of forced transport wash columns. At the feed side of the wash column a porous bed of crystals is formed by removing mother liquor through one or more filters. In the thus-formed bed the relatively pure crystals are still in contact with the portion of impure mother liquor that could not be removed by the filtration. After forming the bed, the forced transport of the bed to the product side of the wash column, which is opposite the position of the feed, can be started. In a forced transport wash column the bed transport is forced by means of mechanical devices, like a piston or a screw conveyor, or by a hydraulic force, i.e. a liquid pressure. At the product side of the wash column the porous crystal bed is disintegrated by means of a mechanical device like a rotating scraper knife or by means of the impulse of a circulating liquid stream. An example of the latter column is given in WO-A-03/063997. Other examples of wash columns in patent literature are U.S. Pat. No. 4,309,878; WO-A-84/00117; WO-A-84/00118; EP-A-0 398 437; WO-A-98/25889; WO-A-98/27240; EP-A-0 948 984; and WO-A-00/24491, all of which documents are incorporated herein by reference.

The crystals released from the bed enter the so-called reslurry chamber of the wash column, which is close/adjacent to the position where bed disintegration occurs. In a wash column with a downwards moving bed the reslurry chamber is typically at the bottom of the column. In an upwards moving bed column it is typically at the top of the column.

DETAILED DESCRIPTION OF THE INVENTION

Figure 1:
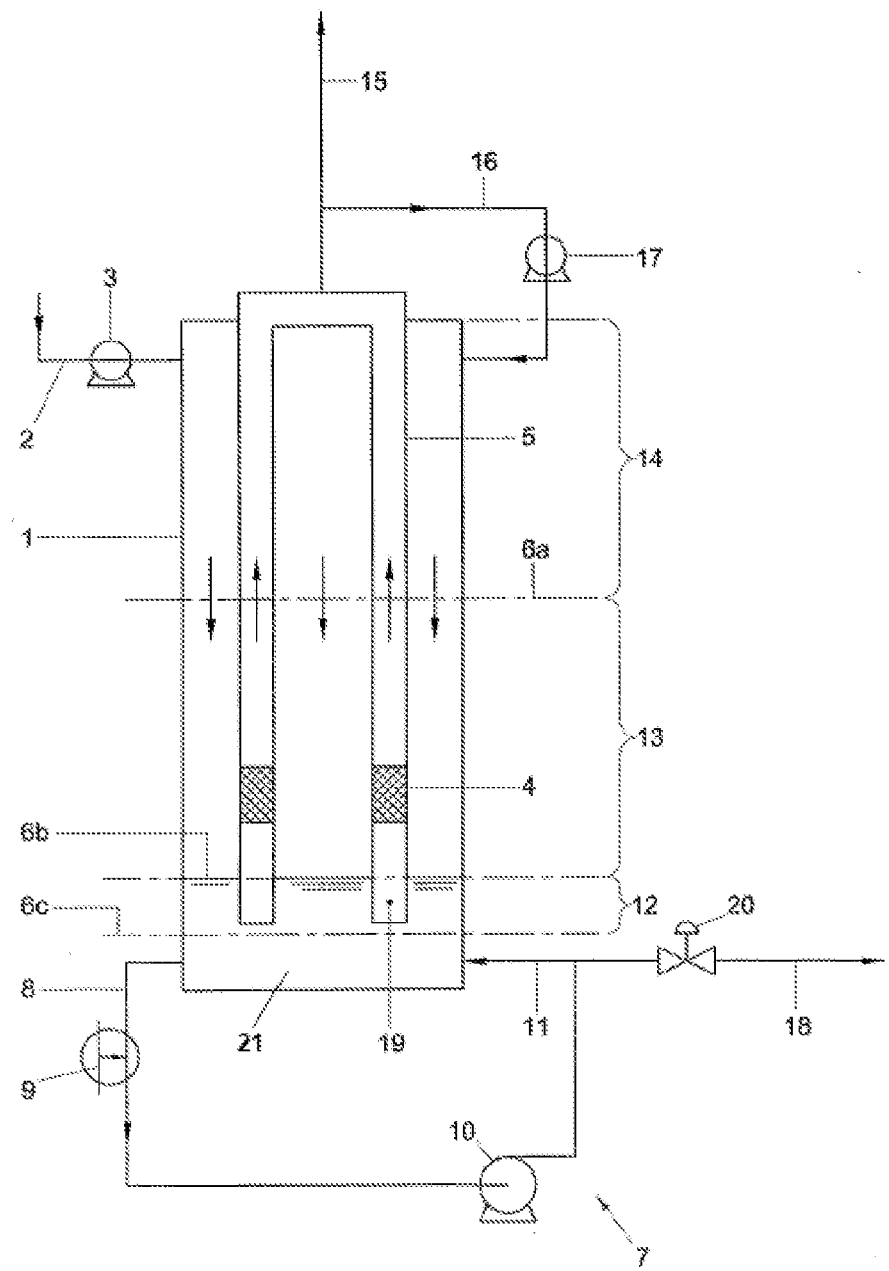
FIG. 1 represents a schematic cross section of a prior art example of a wash column apparatus.

FIG. 1 represents a schematic cross section of a prior art example of a wash column apparatus. It comprises vessel (1) provided with means for supplying a suspension which, according to this example, comprise supply pipe (2) and pump (3) used to feed a slurry from an upstream crystallizer. The apparatus further comprises at least one filtering element (4), means (5) for discharging liquid which passes the filtering element, so that a packed, porous bed of solid particles can form around the filtering element. According to FIG. 1, the top side of the porous bed is located on line (6a). The wash front, which will be explained later, is located on line (6b) and the bottom side of the packed, porous bed is located on line (6c). Further, means (7) may be present for disintegrating or breaking up the packed bed, which are described in detail, for instance, in WO-A-03/063997, including the inductive heating by subjecting at least part of the bed to an alternating electromagnetic field, whereby an electrical current is induced in the bed and vortices arise, among which eddies (small-scale vortices). The wash column can also be operated with conventional means for disintegrating the packed bed, e.g. by using a rotating scraper knife. In the example of FIG. 1, these means for disintegrating comprise a circuit in which a liquid is circulating. In the example, this liquid has three important functions: (a) transport of the solids originating from the disintegrated bed to the heater ("melter") (9); (b) washing of the crystals in the wash zone between (6b) and (6c); and (c) disintegration of the bed by using the impulse of the circulating liquid. This last function is optional and can for instance be replaced by mechanical means for disintegrating the bed like a rotating scraper knife. The circulating liquid is supplied in the so-called reslurry chamber (21) via line (11) and discharged from the reslurry chamber (21) at point (8) after having incorporated the solids originating from the disintegrated bed. In this circuit, the circulating liquid is heated by means of heat exchanger (9) ("melter"), which causes all or at least a significant part of the crystals/solids to melt, and the impulse of the liquid needed to disintegrate the bed is provided by the melt circulation pump (10).

According to the example of FIG. 1, a suspension is continuously pumped into the wash column via supply line (2). During start up a porous bed of crystals forms between (6a) and (6c) around the filtering elements (4). Thus, a packed bed of solid particles coming from the mother liquid slurry forms near the filtering elements (4). This can be understood as follows. During start up the crystals are retained by the filtering element while the liquid can pass. This originates in the formation of a porous plug of crystals, which gradually grows into a porous packed bed of crystals. The closure of the packed bed can be detected from the arising of a pressure difference between the feed and product side of the wash column. The position of the feed side of the closed packed bed (6a) will typically be 1 to 50 cm above the filtering elements after start up for a downwards moving bed as depicted in FIG. 1. During steady state operation the position of the feed side bed (6a) will be typically 5-30 cm above the filtering element. For the configuration with an upwards moving bed the distance remain identical, but now (6a) is positioned below the filtering elements. The mother liquor can pass the filters and leaves the column via the filter pipes (5) (in upward direction in the embodiment of FIG. 1, as represented by arrows pointing upwards). In the example of FIG. 1, a hydraulic pressure is built up above position (6a) in the top section of the wash column (1). As soon as the product valve (20) is opened, the hydraulic pressure causes the bed to transport downwards, represented by arrows in the bed pointing downwards. The moving bed passes the wash front (6b) and it is disintegrated in the reslurry chamber (21) at the bottom side of the column (below 6c). The filtering elements (4) are lengthened at the bottom side with a filter tube extension (19). This filter tube extension can for instance be a solid PTFE tube, but other materials are also possible. The main functions of the filter tube extension is to guide the packed bed in the direction mentioned without changing the structure/packing of the bed and to prevent that the surface of the filter tube/filter tube extension becomes so cold that the relatively pure wash liquid present in the was zone starts to crystallize on the cold surface of the filter tube/filter tube extension. Under normal conditions three zones can be distinguished in a wash column with hydraulic transport of the bed: a wash zone (12); the centration zone (13) and the suspension zone (14). The wash zone (12) is formed in the wash column between (6b) and (6c) and the concentration zone (13) between (6a) and (6b). At (14), the suspension zone is located, in which zone the concentration of particles is at most equal to that of the supplied suspension, which suspension, if desired, is diluted in this zone by the recirculation of part of the filtrate via pipe (16) and pump (17). Line (16) does not necessarily have to go directly to the wash column but it may for instance also exit in feed line (2) between the feed pump (3) and wash column (1). By this optional filtrate recycle, also called steering flow, the pressure in the wash column and thereby the transport force acting on the bed can be set at the desired value. The rest of the mother liquor, i.e. filtrate, is discharged via discharge pipe (15). The wash column product, which consists completely or predominantly of the molten pure crystals origi-nating from the disintegrated bed, is discharged via line (18). The wash liquid, which is used in the counter-current washing in the wash zone (12), has the same composition as the product. Control valve (20) is used for setting the proper pressure needed for washing below the wash front, and determines the size of the drain flow (18).

The so-called melting circuit is formed by the loop of discharge (8) and feedback (11) lines, the melter (9), the melt circulation pump (10) and the reslurry chamber (21), viz. the space in column (1) where bed disintegration occurs i.e. the space below the bottom of the tubes, which are typically formed by PTFE filter tube extensions (19) which position is schematically marked as (6c) in FIG. 1.

More generally, the melting circuit typically comprises the reslurry chamber, a melter, a circulation pump, a product control valve and the tubings connecting these components. A liquid stream circulating in the melting circuit transports the crystals from the reslurry chamber to the melter. The heat required for melting can be supplied for instance by electrical heating elements or by contacting the crystal suspension in a heat exchanger type melter with a hot process utility such as steam, water or oil. The main portion of the melt generated in the melter is taken off as product via the so-called product control valve. A small portion of the molten product generated in the melter is circulated to the earlier mentioned reslurry chamber at the end of the wash column. This circulating melt, which in steady state and without the addition of the miscible component(s) will have about the same composition as the pure crystals, has as indicated above three important functions. The first function is to transport the next portion of crystals originating from the disintegrated bed to the melter. In the described hydraulic wash column used in the Examples the second function of the recirculating liquid was to supply the impulse that is responsible for disintegration of the bed. This second function is optional in the sense that the invention can also be carried out in a forced transport wash column which uses mechanical means like a rotating scraper knife for disintegration of the bed. The third function of the circulating melt is that a fraction of this melt, which is often referred to as the wash liquid, is forced to enter the crystal bed in order to attain a counter-current washing. The force for the wash liquid to enter the crystal bed is the over-pressure in the melting circuit, which can be generated and controlled by means of the product control valve. The term "counter-current washing" means that the (packed bed of) crystals and the wash liquid move in opposite directions. So, when the crystal bed moves downwards, the wash liquid flows upwards and vice versa. The counter-current washing action avoids that the impurities present in the adhering mother liquor can reach the pure product. This removal of mother liquor results in a very high purification efficiency. Typically, the product of the wash column in the presence of a wash front contains 100 to 1000 times less impurities than the mother liquor in which the crystals were grown. This high efficiency that can be realized by the combination of solid-liquid separation and counter-current washing has already been proven for various applications, such as a variety of organic chemicals, ice (water), metals, etc. The remarkable counter-current washing process in forced transport wash columns is explained in more detail hereinbelow.

A specific and special phenomenon for the counter-current washing in a wash column, particularly in a forced transport wash column, is that the relatively pure wash liquid will somewhere in the wash column re-crystallize on the cold crystal bed, which is moving in opposite direction than the wash liquid. At the position where re-crystallization occurs the so-called wash front is formed, which marks steep gradients in concentrations, temperature and porosity of the bed. In a wash column with a downwards moving bed of crystals the temperature above the wash front will be lower than below the wash front. This is due to the fact that the crystals above the wash front still have the operating temperature of the crystallizer while the wash liquid has the (higher) melting temperature of the pure crystals. The replacement of the impure mother liquor by pure wash liquid also causes that the impurity concentration above the wash front is higher than below the wash front. In a wash column with an upwards moving bed the gradients and phenomena are the same, but in a reversed sequence. So, in that case the temperature will be higher above the wash front and the impurity concentration above the wash front will be lower.

The high purification efficiency of conventional wash columns can however only be obtained in a limited operating window. One of the main parameters limiting this operating window is that there is a maximum difference in the temperature at both sides of the wash front, viz. between the feed suspension and the molten product. Exceeding this maximum temperature difference will cause recrystallization of too much wash liquid at the wash front. As a result, the pore volume in the washed crystal bed becomes so low that it is no longer possible to maintain the counter-current washing process under technically and/or economically acceptable conditions. This limits the versatility of wash columns, the operating window as well as their production capacity. Although it is in principle possible to operate the wash column in the absence of a wash front, this leads to a considerable decrease in purification efficiency as compared to operation in the presence of a wash front.

So the problem to be solved is to increase the operating window of forced transport wash columns without loosing the possibility to create counter-current washing and a wash front, which are responsible for the high purification efficiency that can be typically obtained in forced transport wash columns. It was found that the limitation in the operating window of forced transport wash columns can be overcome at least in part by adding a compound or composition between the wash front (6b) and a product outlet and/or in the melting circuit, which compound or composition has no adverse effect on the product quality.

Accordingly, in a first aspect the invention is directed to an apparatus for separating solid particles from a mother liquor slurry, comprising a wash column, which comprises a melting circuit, wherein means are present to introduce a compound or composition to said wash column between a wash front formed in said wash column in operation and a product outlet and/or in the melting circuit.

In a further aspect the invention is directed to a process for separating solid particles from a mother liquor slurry in a wash column, which process is preferably operated in an apparatus according to any of the previous claims, said process comprising separating the liquid from the solid particles by filtration with the aid of at least one filtering element, while a packed bed of solid particles coming from the mother liquid slurry forms near said filtering element, and wherein a wash front forms which is obtained by bringing a washing liquid in countercurrent to the solid particles in the bed, the bed being subjected to a movement in the direction of said wash front, while a product stream comprising the material of said solid particles is obtained by continuously discharging a portion of said washing liquid, wherein a portion of said bed is continuously disintegrated, characterized in that a compound or composition is introduced into said wash column between the wash front and a product outlet and/or in an melting circuit, and wherein the introduction of the said compound or composition decreases the equilibrium temperature of the contents of the melting circuit, further characterized by the feature that the added compound or composition is completely miscible with the product suspension and/or molten product being present in the said melting circuit.

The compound or composition introduced into the wash column is substantially completely miscible with the original product stream and does not affect the usability of the final product and/or can be separated afterwards in an easy cost effective way. By introducing the compound or composition between the wash front and a product outlet and/or to the melting circuit in accordance with the present invention the operating window of the wash columns is extended considerably and the specific production capacity increases.

Although an apparent disadvantage of the introduction of an extra compound or composition in accordance with the present invention is that no complete recrystallization of the wash liquid may occur during the washing process, the present inventors surprisingly found that the benefits of the introduction outweigh the possible disadvantages by far.

The operating window of a wash column is amongst others determined by the maximum temperature difference over the wash front, i.e. the temperature difference between the feed and product side of the wash column. This maximum temperature difference over the wash front depends on the application, i.e. the product, as it is amongst others determined by the size and shape of the crystals, the starting porosity in the feed side bed and the heat of crystallization of the product.

Scholz et al. (R. Scholz and R. Ruemekorf, Proceedings of BIWIC 2007, 14th International Workshop on Industrial Crystallization, A. E. Lewis and C. Olsen (Eds.) Sep. 9-11, 2007, Cape Town, South Africa, pp. 119-125) reported maximum temperature differences over the wash front in a forced transport wash column for several applications. Reported values are:

about 8° C. for durene (1,2,4,5-tetramethylbenzene);
about 10° C. for phosphoric acid hemi-hydrate;
about 13° C. for para-xylene;
about 17° C. for para-dichlorobenzene; and
about 25° C. for hydrogen peroxide.

In all mentioned applications the washing was done with a wash liquid originating from the pure, washed crystals and this wash liquid crystallizes completely at the wash front. Such a washing process is well known and is for instance described in WO-A-98/25889, EP-A-1 970 349 and EP-A-1 272 453. In such a washing process, the temperature of the wash liquid is close to the melting point of the pure product, which is for instance 13.2° C. for para-xylene and 29.3° C. for phosphoric acid hemi-hydrate.

Thus, when the temperature of the wash liquid is fixed and with the given maximum temperature difference over the wash front for a certain application the minimum operating temperature of the crystallizer in a one-stage process can be determined from the phase diagram. This minimum operating temperature of the crystallizer corresponds to the maximum level to which the impurities can be accumulated in the mother liquor in the one-stage process and this on its turn determines in combination with the feed composition the maximum yield for that one-stage process. The following example illustrates the consequences from the above phenomena on the purification of phosphoric acid hemi-hydrate.

Figure 2:
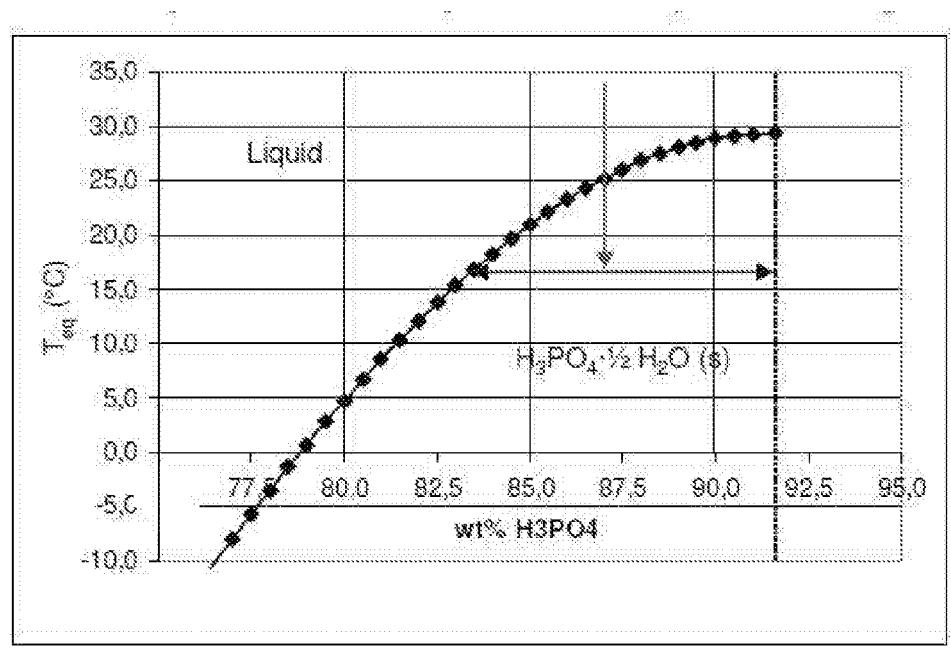
FIG. 2 is a phase diagram for purified phosphoric acid hemi-hydrate.

For instance, it may be desired to upgrade typical food-grade phosphoric acid to high purity grade that allows it to be used in semiconductor production or the manufacture of LCDs (liquid crystal displays), or other applications. A typical food grade feed contains about 85 wt. % phosphoric acid and 14-15 wt. % water. The most important impurities in the feed are ions like Na, Fe, Sb and $SO_4$, which are typically present at a level of 1 ppm up to a couple of hundreds of ppm (on weight basis; all amounts expressed herein are on a weight basis unless indicated otherwise). The product is phosphoric acid hemi-hydrate, which contains 91.6 wt. % phosphoric acid, a (sometimes strongly) reduced concentration of ionic impurities (going down to the low ppm or even ppb level, viz. less than 1 ppm) and water. As can be seen from the phase diagram in FIG. 2, the melting point of the purified phosphoric acid hemi-hydrate is 29.3° C. This means that the product will be solid at normal temperatures of around 20 to 25° C.

When a one-stage process for producing high purity phosphoric acid hemi-hydrate is ran at the maximum of 10° C. temperature difference over the wash front reported by Scholz et al. the feed suspension for the wash column will have a temperature of 29.3° C.−10° C.=19.3° C. It follows from the phase diagram shown in FIG. 2 that the corresponding concentration of the mother liquor will then amount to 84.3 wt. % phosphoric acid. The concentrations of water and the ionic impurities in the mother liquor are in this situation about 1.05 and 1.1 times higher than in a typical phosphoric acid food grade feed, respectively. The yield on phosphoric acid for this one-stage separation is only 9.8%. In principle, the yield of the process could be increased by using a feed with less water. This could for instance be prepared from food grade phosphoric acid by applying a pre-concentration step like evaporation in which part of the water is removed before the crystallizer. The disadvantage of this procedure is that it will increase the investment and operating costs for the process.

The invention can thus extend the operating window of a wash column, preferably a forced transport wash column. This invention is based on introducing a compound or composition into the wash column between the wash front and the product outlet and/or in the melting circuit, which component does not adversely affect the product quality, but which affects the composition and melting/solidification temperature of the wash liquid.

Addition of a compound or composition to a wash column process is in principle known from EP-A-1 970 349. However, there are fundamental differences between this prior art document and the invention. In EP-A-1 970 349 a conventional forced transport wash column is employed for the separation of relatively pure phosphoric acid hemi-hydrate crystals from a mother liquor in which the ionic impurities are concentrated. Unlike the present invention, EP-A-1 970 349 does not disclose means to introduce a compound or composition into the wash column between the wash front and the product outlet and/or in the melting circuit, but rather mentions the possibility to add water to the feed upstream the crystallizer. Introduction of the compound or composition between the wash front and the product outlet and/or in the melting circuit allows using the exothermic heat of reaction obtained by adding water to a suspension of phosphoric acid hemi-hydrate suspension as source for melting the washed crystals next to heating. Moreover, addition of a compound or composition between the wash front and the product outlet and/or in the melting circuit leads to a decrease of the temperature difference over the wash front, whereas water addition upstream the crystallizer as in EP-A-1 970 349 increases the temperature difference over the wash front. A reduction of the temperature difference can be deployed to increase the process yield and/or the production capacity of the wash column and surprisingly also the separation level. Another important and discriminating feature of the present invention is that part of the purified melt is lost during the re-crystallization at the wash front on the supercooled crystals. As such, this feature can be regarded as a negative effect on the process as it will increase the recycle stream to the crystallizer.

Figure 3:
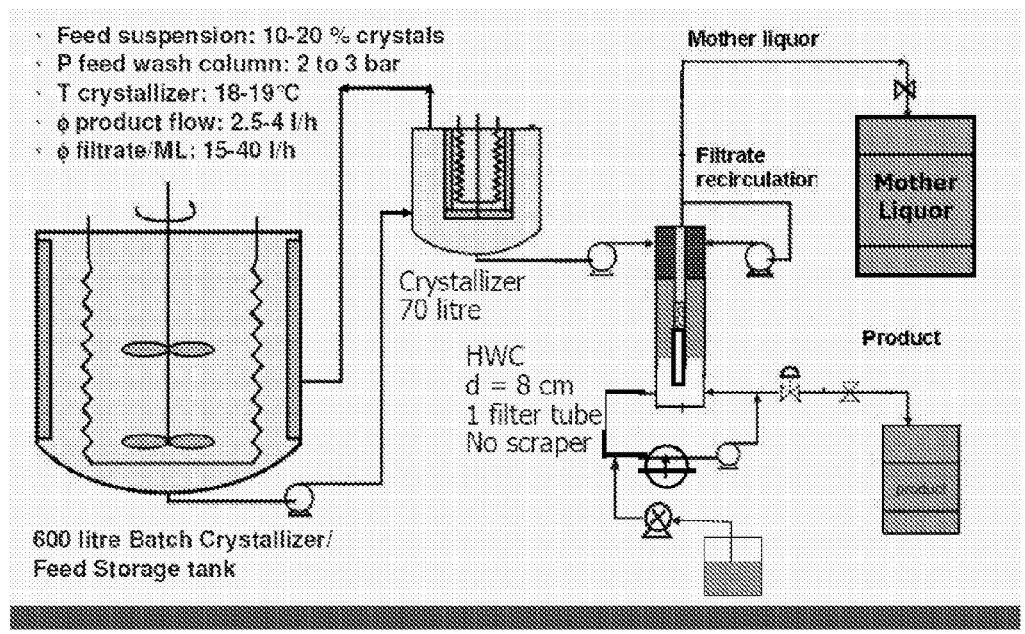
FIG. 3 shows a typical setup of a suspension-based melt crystallization process in which a wash column apparatus according to the invention can be comprised.

FIG. 3 shows a typical setup of a suspension based melt crystallization process in which a wash column apparatus according to the invention can be comprised. The setup shown in FIG. 3 was also used for carrying out the examples described hereinbelow. This installation includes a large 600 liter feed storage tank, a 70 liter continuous crystallizer and an 8 cm diameter forced transport wash column with one filter tube and hydraulic pressure as means for forcing the bed transport.

The choice of the crystallizer is not critical for the invention and a choice can be made between the numerous crystallizers described in literature and the commercially available crystallizers. An illustrating but non-limitative set of examples of suitable suspension crystallizers are: scraped drum crystallizers, scraped cooling disk crystallizers, growth vessels which are combined with an external scraped heat exchanger, an unscraped jacketed vessel or an evaporative cooling crystallizer. In this last type, part or all of the required cooling is caused by the selective evaporation of a solvent or an impurity present in the feed. During the crystallization relatively pure crystals are formed, because most impurities do not fit in the regular crystal lattice due to their different size and/or shape. Consequently, the impurities are excluded from the crystals and they accumulate preferentially in the mother liquor. When the process aims at a high product purity, the suspension consisting of pure crystals and impure mother liquor is preferentially separated in a forced transport wash column, as this device results in a much better purification than can be obtained in conventional solid-liquid separators like filters or centrifuges.

An apparatus in accordance with the present invention comprises a conventional wash column, for instance of the type described in WO-A-03/063997, as well as the prior art cited therein. In a preferred embodiment of the invention a forced transport wash column is applied, such as shown in FIG. 1 and described hereinabove. The apparatus of the invention further comprises means to add the extra component, which comprise a dosage system, e.g. a pump, piping and at least one valve to add the component to the melting circuit and/or the wash zone.

Figure 4:
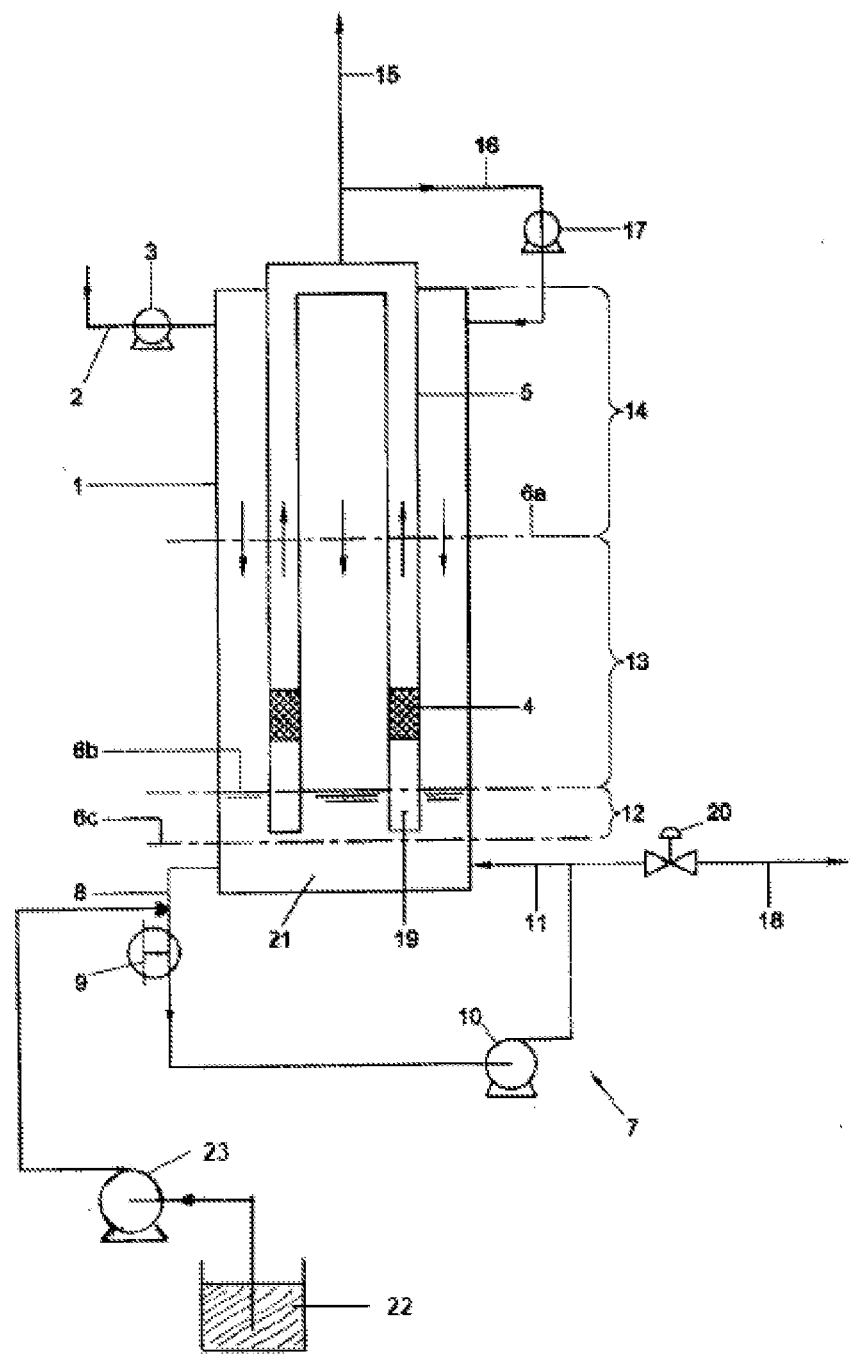
FIG. 4 shows a schematic cross-section of an example of a wash column apparatus according to the invention.

FIG. 4 shows a schematic cross-section of an example of a wash column apparatus according to the invention. The wash column apparatus in FIG. 4 is similar to the wash column shown in FIG. 1. However, in the example shown in FIG. 4, a compound or composition (22) is introduced in the wash column (1) between the wash front (6b) and a product outlet (18) and/or in the melting circuit, which compound or composition is miscible in the stream circulating in the melting circuit and remains at least in part in said purified product stream. In FIG. 4, the compound or composition is introduced by means of pump (23) at a point just upstream of heat exchanger/melter (9), but it may be introduced at any other point between the wash front and the product outlet and/or in the melting circuit and also by any other means suited for dosing liquids not being a pump. For example, the compound or composition (22) can be introduced in the wash column (1), between the wash front (6b) and a product outlet, such as in the wash zone, or in the reslurry chamber between the wash zone and the product outlet. When the compound or composition (22) is introduced directly to the wash column, the compound or composition may be injected by one or more inlets in the lateral wall of the wash column, but may also be injected by means of one or more inlets in the bottom or in the top of the wash column, respectively, depending on whether the reslurry chamber is located at the bottom or the top of the wash column. Any combinations thereof are also possible. Furthermore, the compound or composition can be introduced by creating a channel and an inlet between the wash front and the product outlet (such as in the wash zone) through the filter tube extension and/or the filter tube itself. This has the advantage that the compound or composition (22) is well distributed over the total surface area of the wash column. Alternatively (or in addition), the compound or composition (22) can be introduced at any point in the melting circuit such as upstream heat exchanger (9), downstream heat exchanger (9), upstream melt circulation pump (10), downstream melt circulation pump (10). Again, the compound or composition (22) may be introduced at one or more points of the melt circuit. Introduction of the compound or composition (22) to the melt circuit is from a practical point of view preferred.

Figure 5:
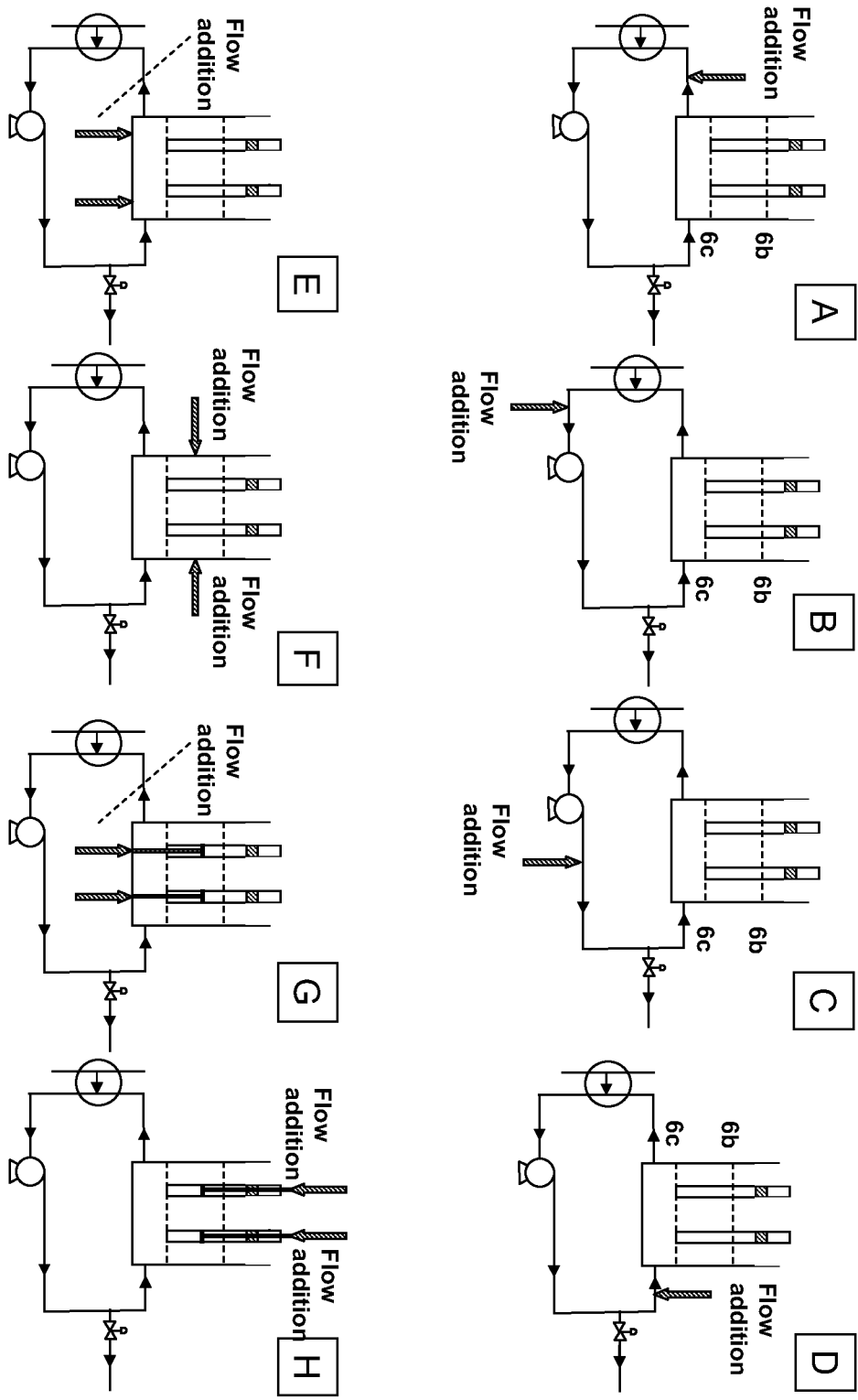
FIG. 5 depicts various possibilities for where the compound or composition according to this invention can be introduced.

FIG. 5 depicts various possibilities for where the compound or composition according to this invention can be introduced. The pictures only serve as illustration and or not intended to limit the invention. For instance, all kind of hybrid solutions with multiple injection points also fulfill the requirements of the invention.

The flexibility with respect to the position where the compound or composition is introduced originates from the fact that the flow rate (defined as a mass per time) through the melting circuit is relatively large compared to the volume of the melting circuit. This is further illustrated by the example that in small scale installations the liquid in the melting circuit could circulate 50-100 times through the melting circuit per hour. The option to introduce the compound or composition in the wash zone (12) is practically a little more complicated, but it will not change the effects described in this invention.

The flow rate of the introduction of the compound or composition can vary and strongly depends on the size of the applied wash column and the specific application. However, as a general rule the flow rate of the introduced compound or composition will in general be smaller than the flow rate of crystals entering the wash zone and/or the melting circuit. More preferably the flow rate of the introduced compound or composition is less than 25% of flow rate of crystals entering the wash zone and/or the melting circuit, or even more preferably less than 10% of the mass of crystals. With these numbers the concentration of the product leaving the wash column is >50 wt %, preferably >80 wt % and even more preferably >90.9 wt %.

For the invention known methods and equipment for adding a compound or composition in a controlled manner to a pressurized liquid or suspension filled apparatus are applicable. Non limitative, illustrative examples of known methods and equipment suited for this invention include pumps, syringes, pistons, closed containers/tanks with a gas filled head. Typically, these devices will be coupled to the wash column by means of at least a feed line, which contains at least one valve. Hence, the means for introducing the compound or composition into the wash column preferably comprise one or more inlets. In an embodiment, the means do not comprise an outlet.

Preferably, the flow rate of the introduced compound or composition will be controlled by means of in-line or on-line measurements in the wash column or down stream the wash column. Various sensors or devices which are suited to measure the composition or the flow rate of the product can be used for determining and controlling the flow rate of the introduced compound or composition. Examples are flow transmitters, chemical analyses and sensors for measuring composition related properties like the conductivity, density, pH, refractive index, viscosity, etc.

For the specific case of the separation of phosphoric acid crystals from a mother liquor slurry water is a good example of such a compound. For other applications, also water may be used, or alternatively any component that does not alter the market value of the product, while it results in lowering the melting temperature of the mixture. Alternatively, compounds or compositions that affect the market value of the product may even also be allowed, provided that they can be removed easily from the product and/or the filtrate (mother liquor). This can be realized for instance by using a compound having a relatively low boiling point and high vapor pressure compared to the product.

In an embodiment, the compound or composition to be introduced is liquid or gaseous, preferably the compound or composition to be introduced is liquid. It is preferred that the compound or composition is also comprised in the mother liquor. Some non-limitative examples of suitable compounds to be introduced in the wash column include water, 2,4'-MDI, and phenol, depending on the process operated in the wash column. Also volatile solvent may suitably be used, including methanol, ethanol, pentane, hexane, acetone, diethyl ether, and the like.

In accordance with the process of the invention, the introduction of the said compound or composition decreases the equilibrium temperature of the contents of the melting circuit. This decrease of the equilibrium temperature can vary depending on the application and may be a decrease of 2° C. or more, such as in the range of 2-25° C., or in the range of 5-10° C.

Below the invention will be further illustrated for the exemplary case of phosphoric acid as product and water as introduced compound. However, the same principles apply for other combinations as well. The example below is just used to illustrate the general principle of the invention. The mentioned application, the introduced compound or composition, and the mentioned operating conditions should not be regarded as limitative for other possible applications of the invention.

In the conventional process for the separation of phosphoric acid crystals from a mother liquid slurry by means of suspension crystallization and wash column technology the product of the wash column consists of the melt of relatively pure phosphoric acid hemi-hydrate crystals. As said before, such a melt will contain about 91.6 wt. % phosphoric acid and about 8.4 wt. % water. The melting point of pure phosphoric acid hemi-hydrate crystals will be around 29.3° C. (see for instance EP-A-1 970 349 and the publication by Scholz et al. Typically, LCD-/semiconductor-grade phosphoric acid is sold with a maximum phosphoric acid content of 85-87 wt. % and 13-15 wt. % water. This is done to prevent partial solidification of the product during transport and storage. Therefore, to obtain a marketable product from a conventional process extra water would be added to the wash column product, i.e. outside/downstream the wash column. In accordance with the invention the extra water can already be introduced into the wash column, and more specifically between the wash front and the product outlet and/or in the melting circuit of the wash column. It was found that the extra water has a strong effect on the equilibrium freezing/melting point of the phosphoric acid-water mixture in the melting circuit and wash zone. For instance, the equilibrium temperatures of mixtures with 85 and 86 wt. % phosphoric acid amount 21.0° C. and 23.3° C., respectively. This is 6.0° C. and 8.3° C. below the melting point of pure phosphoric acid hemi-hydrate (containing 91.6 wt. % phosphoric acid). Non limitative examples of the advantages of adding extra water are:

- The addition of water between the wash front and the product outlet and/or in the melting circuit avoids an extra unit operation to dilute the typical 91.6 wt. % phosphoric acid containing wash column product to the 85-87 wt. % phosphoric acid specification for high purity phosphoric acid.
- The addition of water causes a much smaller temperature difference over the wash front, when the feed composition and the yield are kept the same as in the process without water addition. The consequence of a smaller temperature difference over the wash front is that the specific production capacity of the wash column will increase, due to the smaller amount of wash liquid re-crystallizing at the wash front.
- Alternatively, also in the process in which extra water is introduced into the wash column between the wash front and the product outlet and/or to the melting circuit the wash column can again be operated at the maximum temperature difference of about 10° C. reported by Scholz et al. However, the equilibrium temperature of the wash liquid is significantly decreased compared to the conventional process without the introduction of extra water, which means that the crystallizer in a process according to the present invention can be operated at a lower temperature. The advantage is that the yield of the process increases and/or that the same yield can be attained as in the process without introducing water for a feed containing a higher water concentration.
- The dissolution of water in phosphoric acid is an exothermic reaction, which means that the external heat input in the melter may be decreased.

There is a small disadvantage in introducing extra water between the wash front and the product outlet and/or in the melting circuit of the wash column, being that a wash liquid with 85-87 wt. % phosphoric acid will not crystallize completely at the wash front, while the wash liquid with 91.6 wt. % phosphoric acid in the conventional process will re-crystallize completely. The consequence is that the non-recrystallized portion of wash liquid will mix up with the mother liquor above the wash front and leaves the wash column via the filter(s) in the wash column. This means an increase of the recycle of mother liquor from the wash column to the crystallizer. Consequently, for a given production capacity the crystallizer in the process of the invention with water introduction between the wash front and the product outlet and/or in the melting circuit will be somewhat larger than in the conventional process, but simultaneously the wash column will become smaller and no additional unit operation will be required for dilution of the 91.6 wt. % phosphoric acid to 85-87 wt. % phosphoric acid. It has thus been found that the above mentioned advantages outbalance the mentioned disadvantage easily.

The new idea has been illustrated and proven for the separation of phosphoric acid crystals from mother liquor slurry, but it can also be used in other applications. The criterion is that there must be a compound or composition that can be introduced to the wash column product that does not harm the sales specifications of that product while the introduction of the compound or composition leads to a decrease of the melting temperature of the mixture. Preferably, the compound or composition to be introduced should not hinder the upstream crystallization, as the introduced compound or composition will be recycled to the crystallizer via the portion of the wash liquid that did not re-crystallized at the wash front. Notwithstanding the above given guidelines, as mentioned previously, it remains possible to also introduce compounds or compositions that can may lower the sales value of the product, provided that the introduced compound or composition can be removed easily from the product and/or the recycle stream to the crystallizer. Examples of such compounds are for instance volatile organic solvents with a low boiling point and/or a high vapor pressure compared to the product. Non limitative examples of such solvents are methanol, ethanol, pentane, hexane, acetone, ether, etc.

Other processes that could benefit from the present invention are the separation of solid particles such as methylene diphenyl diisocyanate (4,4'-MDI or p,p-MDI), bisphenol A-phenol adduct and acrylic acid from mother liquor slurries. The reasons behind these applications are as follows:

- the required product purity of p,p-MDI is "only" 97 wt. % (viz. relatively far from 100 wt. %), which means that the impurity 2,4'-MDI (m,p-MDI) can be introduced into the wash column between the wash front and the product outlet and/or in the melting circuit. 2-4'-MDI can be introduced in pure form but also as a mixture such as a feed or process stream that contains both the product and 2,4'-MDI;
- phenol can be introduced between the wash front and the product outlet and/or to the melting circuit of a wash column for bisphenol A-phenol adduct in order to decrease the temperature difference over the wash front. Phenol is the solvent and/or a process aid in production processes for bisphenol A. Again the phenol could be introduced in pure form or as a mixture such as a process stream containing a higher concentration of phenol than the bisphenol A-phenol adduct;
- for some applications of acrylic acid water is not considered as an impurity. This means that water could be introduced into the wash column between the wash front and the product outlet and/or to the melting circuit in order to decrease the temperature difference over the wash front.

The amounts of the compound or composition to be introduced may vary, depending on the application. Generally the amount to be introduced will be between 1 and 20 wt. % (relative to the weight of crystals) for each of the above-mentioned and other examples.

The apparatus and method of the invention are further illustrated by the following non-limiting examples, which represent a laboratory scale feasibility study on a process that can be carried out with such an apparatus (example 1), and a test in an industrial pilot installation (example 2).

EXAMPLE 1

A crystallizer and wash column setup as schematically depicted in FIG. 3 was used. The wash column was equipped with a HPLC-type piston dosage pump for water, which could be added by means of a valve to the melting circuit. The experiment was started with the conventional purification, i.e. without introducing extra water in the melting circuit of the wash column. The wash column was operated for about 5.5 hrs in this configuration. After 5.5 hours the water introduction in the melting circuit was started. The feed in this experiment was a Food grade Phosphoric Acid obtained from FMC Foret. This feed contains about 84.5 wt.

% phosphoric acid, 15.5 wt. % water and further contains Na, $SO_4$, Ca, Fe and Zn as most important ionic impurities.

Table 1 compares the values of a number of important process parameters for the conventional apparatus and the new apparatus according to the invention. The latter is characterized by data gathered 2 hours and 15 minutes after start of the water addition and the former by the data valid after the first 5.5 hours of wash column operation without the addition of water.

Table 1: Operating conditions for the purification of phosphoric acid hemi-hydrate with a conventional forced transport wash column and a forced transport wash column according to this invention. The data after 5.5 hours were collected using the conventional apparatus, viz. without means for adding water in the melting circuit/wash zone, while the data after 7 hours and 45 minutes were collected using the equipment of the invention, viz. with means for introducing water in the melting circuit/wash zone. The water introduction was started after 5.5 hours, implying that the wash column was operated according to the present invention for 2 hours and 15 minutes with the introduction of water in the melting circuit. The table presents experimentally measured parameters, for the temperatures also the theoretical values are given between brackets.

| Parameter | Value after 5.5 hours (without water introduction) | Value after 7 hours and 45 minutes (i.e. with water introduction during the last 2 hours and 15 minutes) |
|---|---|---|
| Feed pressure | 2.3 bar | 2.3 bar |
| Wash pressure | 1.1-1.2 bar | 1.2-1.4 bar |
| T feed suspension | 18.5° C. (18.3° C.) | 18.5° C. (18.3° C.) |
| T product in melting circuit | 28.8° C. (29.3° C.) | 24.0° C. (23.3° C.) |
| ΔT over wash front | 10.3° C. (11.0° C.) | 5.5° C. (5.0° C.) |
| Product | 91.0 wt. % $H_3PO_4$ | 86.0 wt. % $H_3PO_4$ |
| Production capacity | 5-7 kg/hr as 91.6 wt. % $H_3PO_4$ | 7.7-8.7 kg/hr 86 wt. % $H_3PO_4$ = 7.2-8.2 kg/hr as 91.6 wt. % $H_3PO_4$ |
| [$H_3PO_4$] in mother liquor | 84.0 wt. % | 84.0 wt. % |

Table 1 shows the surprising effect that running the process according to this invention results in a more than 25% increase of the production capacity. Table 1 also reveals that both the temperature difference as well as the pressure difference over the wash front decrease as a result of the introduction of water in the melting circuit after 5.5 hrs. The decrease of the temperature difference is caused by the decreasing melting point of the 86 wt. % phosphoric acid containing mixture of the molten phosphoric acid hemi-hydrate crystals and the introduced water. The temperature of the feed suspension/mother liquor did not chance after the introduction of water. The data show that the experimentally measured temperature difference over the wash front could be decreased by 4.8° C. by the introduction of water. The theoretical temperature difference over the wash front for a mother liquor and product as specified in Table 1 amounts 6.0° C. A further reduction of the phosphoric acid content of the product to 85 wt. % would decrease the temperature difference over the wash front by another 2.3° C. So, for the specific case of the purification of phosphoric acid hemi-hydrate the temperature difference over the wash front can be decreased by 8.3° C. by going from a product with 91.6 wt. % to 85 wt. % phosphoric acid. This value is very significant, as Scholz et al. reported that the maximum temperature difference over the wash front for the purification of phosphoric acid in a conventional forced transport wash column was limited to 10° C.

The difference between the feed pressure and the wash pressure also decreased slightly. In this observation two effects play a role. Firstly, the lower phosphoric acid concentration in the melting circuit and wash zone and the lower temperature difference over the wash front for the apparatus and process operated according to the invention will cause less wash liquid to re-crystallize. Therefore, there will be a relatively small reduction of the porosity of the washed bed, which effect suppresses the wash pressure. The second effect is that the production capacity increased by more than 25% after the introduction of water, as noted above. The unchanged feed pressure shows that it did not require a higher driving force to transport this larger amount of product through the wash column. In the melting circuit, however, the introduction of water and the higher amount of molten crystals will most likely cause an increase of the wash pressure. The data in Table 1 indicate that the second effect seems to be larger than the first as the measured wash pressure increases slightly after the introduction of water. As a result the effective pressure difference over the bed, which is here defined as the feed pressure minus the wash pressure, decreases thus indicating that the bed transport was relatively easy despite of the significantly higher production capacity.

This example has thus revealed that running the wash column according to the present invention causes significant positive effects on the production capacity of the wash column.

EXAMPLE 2

For this example an industrial pilot installation was used, which consisted of a 1 $m^3$ suspension crystallizer and a 30 cm diameter TNO Hydraulic Wash Column with 16 filter tubes. Water was added in the melting circuit of the wash column between the wash column and the melt circulation pump via a control valve from a pressurized system containing demineralized process water (all ions below 1 ppb). The feed in this experiment was a food grade phosphoric acid obtained from Prayon, which contained about 85 wt. % phosphoric acid, 15 wt. % water and further contains many ionic trace compounds like Na, $SO_4$, B and Zn.

Figure 6:
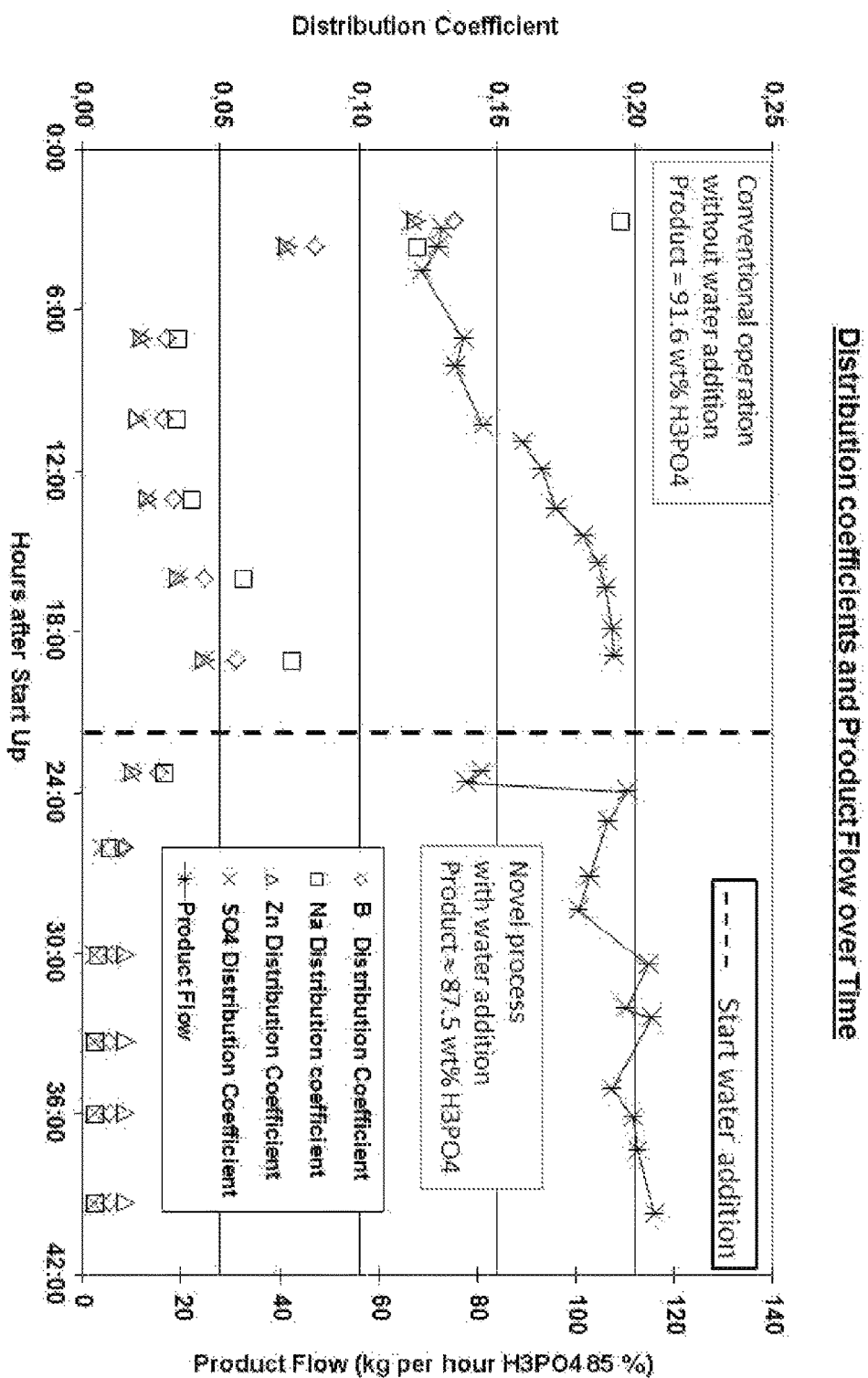
FIG. 6 is a graph of distribution coefficients and product flow over time for the disclosed apparatus and method.

During the first 22 hours the wash column was operated conventionally, i.e. without introducing extra water in the melting circuit of the wash column. During this time it was tried to increase the production capacity. To enable comparison of the production capacity before and after water addition all production capacities have been calculated as kg 85 wt. % $H_3PO_4$ per hour. FIG. 6 shows that it was possible to increase capacity, but that it was impossible to maintain the level of separation at the same level as can be seen from the increase of the distribution coefficient at increased production capacity. The distribution coefficient which is defined as the ratio between the concentration of a specific trace compound in the product and the concentration of the same trace compound in the liquid in which the crystals were grown, which is the filtrate of the wash column. The lower the distribution coefficient, the better the product is separated from the liquid mother slurry. The lowest values of the distribution coefficients for B, Na, Zn and $SO_4$ in the absence of water addition were achieved 7 to 9 hours after start up, with values between 0.02 and 0.04, which means that the product contains 25-50 times lower concentrations of trace compounds than the filtrate/mother liquor.

Figure 7:
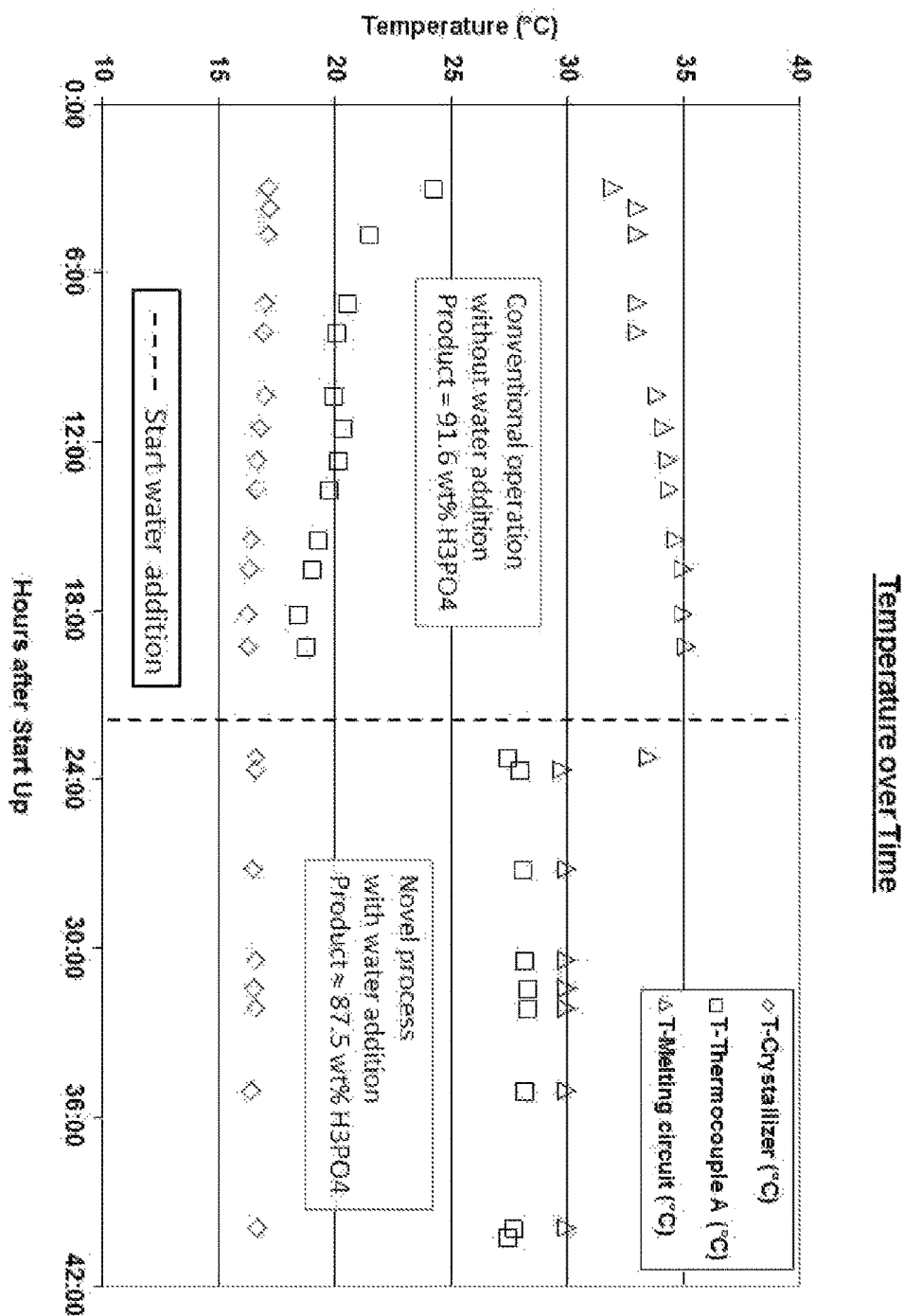
FIG. 7 is a graph of temperature over time for the disclosed apparatus and method.

FIG. 7 shows that the wash front was already low soon after start up. The temperature of the thermocouple A which is positioned 1 inch above the bottom end of the filter tubes indicates a temperature which is rather close to the temperature in the crystallizer, i.e. the temperature of the feed of the wash column, and far below the temperature of the pure melt in the melting circuit which is slightly above the equilibrium melting temperature of pure phosphoric acid hemi-hydrate. With a well established wash front this melt would be forced higher in the wash column and thermocouple A would notice a temperature close or equal to the temperature in the melting circuit. The above observations indicate that the wash front was slowly but steadily pushed out of the washing zone by the increase in capacity.

After 22 hours the water introduction in the melting circuit was started. The density of the product was measured in-line and the control valve was controlled to bring the product to a concentration of about 87.5 wt. % phosphoric acid, which has an equilibrium melting temperature of 26.1° C. FIGS. 6 and 7 show that the responses on this action are rapid and significant. FIG. 6 shows that the distribution coefficients decrease to values in the order of 0.005 to 0.02, which are significantly lower than in the absence of water addition and the decrease is much bigger than could be expected on basis of the dilution effect originating from the water addition, which reduces the concentration of trace compounds in the product with 6.2%. FIG. 6 also shows that in the period between 24 and 40 hours after start up a significantly higher level of separation could be realized at production rates similar to or even slightly better than the values achieved in the period of operation without water addition. The relatively low production capacities between 22 and 23.5 hours after start were caused by the fact that the system has to be adjusted to the new process conditions required for operation with water addition.

FIG. 7 shows that the addition of water caused a decrease of the temperature in the melting circuit, which corresponds to the fact that the melting point of 87.5 wt. % phosphoric acid is lower than for 91.6 wt. % phosphoric acid. Secondly, thermocouple A now measures a temperature close to the temperature of the melting circuit and significantly higher than the temperature of the crystallizer. This proves that the wash front is formed at or above the position of thermocouple A, This indicates that decreasing the temperature difference over the wash front facilitates washing and this is accompanied by a significant and large effect on the separation efficiency.

The invention claimed is:

1. Process for separating solid particles from a mother liquor slurry in a wash column, the mother liquor slurry having liquid and solid particles, said process comprising separating the liquid from the solid particles by filtration with the aid of at least one filtering element, while a packed bed of solid particles coming from the mother liquor slurry forms near said filtering element, and wherein a wash front forms which is obtained by bringing a washing liquid in countercurrent to the solid particles in the bed, the bed being subjected to a movement in the direction of said wash front, while a product stream comprising the material of said solid particles is obtained by continuously discharging a portion of said washing liquid, wherein a portion of said bed is continuously disintegrated, characterized in that a compound or composition is introduced into said wash column between the wash front and a product outlet and/or in a melting circuit, and wherein the introduction of the said compound or composition causes a decrease of the equilibrium temperature of the contents in the melting circuit by 2° C. or more, thereby decreasing the temperature difference over the wash front, further characterized by the feature that the introduced compound or composition is completely miscible with a product suspension and/or a molten product being present in the said melting circuit,
   wherein the washing liquid comprises a non-recrystallised fraction, the non-recrystallised fraction mixing with the mother liquor and leaving the wash column via the at least one filtering element.

2. Process according to claim 1, wherein said compound or composition is introduced into said wash column in a wash zone, in a reslurry chamber between the wash zone and the product outlet, and/or in the melting circuit.

3. Process according to claim 2, wherein said compound or composition is introduced into said wash column in the wash zone, and further wherein said compound or composition comprises water.

4. Process according to claim 2, wherein said compound or composition is introduced into said wash column in the melting circuit, further wherein said compound or composition comprises water.

5. Process according to claim 1, wherein said compound or composition is introduced into said wash column in the melting circuit, upstream a heat exchanger, downstream a heat exchanger, upstream a melt circulation pump, and/or downstream a melt circulation pump.

6. Process according to claim 1, wherein said compound or composition is present in the mother liquid slurry.

7. Process according to claim 1, wherein said compound or composition comprises one or more selected from water, 2,4'-MDI, phenol, methanol, ethanol, pentane, hexane, acetone, and diethyl ether.

8. Process according to claim 1, wherein a flow rate at which the compound or composition is introduced into the wash column is smaller than a flow rate of crystals entering a wash zone and/or the melting circuit.

9. Process according to claim 1, wherein the introduced compound or composition is controlled by means of in-line or on-line measurements in the wash column and/or downstream the wash column.

10. Process according to claim 9, wherein said measurements comprise measurements of the composition or a flow rate of the product.

11. Process according to claim 1, wherein a flow rate at which the compound or composition is introduced into the wash column is about 25% less than a flow rate of crystals entering a wash zone and/or the melting circuit.

12. Process according to claim 1, wherein a flow rate at which the compound or composition is introduced into the wash column is about 10% less than a flow rate of crystals entering a wash zone and/or the melting circuit.

* * * * *